United States Patent
Smith et al.

(10) Patent No.: US 6,559,096 B1
(45) Date of Patent: May 6, 2003

(54) DESICCANT COMPOSITION

(75) Inventors: Douglas M. Smith, Albuquerque, NM (US); Elizabeth A. Lucky, Albuquerque, NM (US); Veronica Natividad, Albuquerque, NM (US)

(73) Assignee: Nanopore, Inc., Albuquerque, NM (US)

( * ) Notice: Subject to any disclaimer, the term of this patent is extended or adjusted under 35 U.S.C. 154(b) by 0 days.

(21) Appl. No.: 09/691,371

(22) Filed: Oct. 18, 2000

(51) Int. Cl.$^7$ .................................. B01J 20/04
(52) U.S. Cl. ...................................... 502/411
(58) Field of Search ................. 502/410, 413, 502/407, 411, 405, 416, 417, 423, 427, 439; 423/335

(56) References Cited

U.S. PATENT DOCUMENTS

| | | | | |
|---|---|---|---|---|
| 2,027,093 A | | 1/1936 | Downs ........................... 183/4 |
| 4,402,717 A | | 9/1983 | Izumo et al. ................... 55/388 |
| 4,577,012 A | * | 3/1986 | Tsurushima et al. .......... 536/24 |
| 4,656,153 A | * | 4/1987 | Wennerberg ................. 502/182 |
| 4,702,749 A | | 10/1987 | Sircar et al. .................... 55/33 |
| 4,812,436 A | * | 3/1989 | Staal et al. ................. 502/407 |
| 4,826,516 A | | 5/1989 | Matsuoka et al. ............. 55/388 |
| 4,937,223 A | * | 6/1990 | Yamaguchi .................. 502/427 |
| 4,963,519 A | * | 10/1990 | Okabayashi et al. ......... 502/413 |
| 5,135,548 A | | 8/1992 | Golden et al. .................. 55/25 |
| 5,292,822 A | | 3/1994 | Tanaka et al. ............ 525/329.1 |
| 5,401,706 A | | 3/1995 | Fischer ........................ 502/401 |
| 5,482,915 A | | 1/1996 | Golden et al. .............. 502/417 |
| 5,496,397 A | * | 3/1996 | Fischer et al. ................. 96/154 |
| 5,753,357 A | * | 5/1998 | Filipitsch et al. ......... 428/307.7 |

FOREIGN PATENT DOCUMENTS

| | | | |
|---|---|---|---|
| GB | 573880 | 12/1945 | |
| JP | 55051436 A | 12/1978 | ............ B01J/20/32 |
| JP | 59228935 A | 9/1983 | ............ B01J/20/20 |

\* cited by examiner

*Primary Examiner*—Stanley G. Silverman
*Assistant Examiner*—Edward M. Johnson
(74) *Attorney, Agent, or Firm*—Marsh Fischmann & Breyfogle LLP

(57) ABSTRACT

A desiccant composition and a method for making the desiccant composition. The dessicant composition includes an absorbent such as calcium chloride or lithium chloride which is impregnated onto a highly porous support such as activated carbon that has well controlled porosity characteristics. The material is particularly useful for absorbing high levels of water.

42 Claims, No Drawings

DESICCANT COMPOSITION

BACKGROUND OF THE INVENTION

1. Field of the Invention

The present invention is directed to desiccant compositions, methods for producing desiccant compositions and applications of desiccant compositions. More specifically, the present invention is directed to a composite desiccant composition having a high affinity for water wherein the desiccant includes an absorbent deposited onto a porous, high surface area support.

2. Description of Related Art

Desiccants are materials that are capable of capturing and retaining water in the form of a liquid or a vapor. Desiccants can operate by two fundamental mechanisms referred to as absorption and adsorption. Absorption occurs when a substance (e.g., water vapor) penetrates the inner structure of another (the absorbent). Absorbents for water include salts such as calcium chloride ($CaCl_2$) and lithium chloride (LiCl). Adsorption occurs when a substance (e.g., water vapor) is attracted and held onto the surface of another (the adsorbent). Adsorbents for water vapor include highly porous hydrophilic materials such as activated carbon and silica gel.

Examples of such materials can be found in the prior art. For example, U.S. Pat. No. 4,402,717 by Izumo et al. discloses an apparatus for removing moisture and odors from air. The apparatus includes a cylindrical honeycomb structure fabricated from paper through which the moist air flows. An adsorbent such as activated carbon is incorporated into the paper during the papermaking process to deodorize the air. The paper is also impregnated with an absorbent salt such as lithium chloride by dipping the paper into a salt solution and drying.

U.S. Pat. No. 5,135,548 by Golden et al. discloses an oxygen selective desiccant. A carbon molecular sieve is impregnated with absorbent salts or inorganic oxides for the simultaneous removal of water and oxygen from air to produce nitrogen gas. The carbon molecular sieve is impregnated with the absorbent such that the volume of solvent utilized is roughly equivalent to the pore volume of the materials to be impregnated, resulting in a loading of absorbent on the carbon molecular sieve of about 5 to 10 weight percent.

Japanese Patent Publication No. JP59228935 by Hiroyasu et al. discloses a fibrous active carbon filament which is impregnated with a dehumidifying agent such a lithium chloride, lithium bromide or calcium chloride to form a dehumidifying element. The filaments are wound or woven onto a support structure to form the dehumidifying element. The amount of dehumidifying agent added to the carbon fiber is 0.5 to 90 weight percent. The agent is added by immersing the filament into a salt solution and drying the filament.

For many applications, there is a need to absorb relatively large quantities of water using only a small volume of desiccant. There is also a need for a desiccant that can absorb the water at a fast rate. For example, cooling devices that utilize a sorption cycle for cooling with water as a refrigerant require that large quantities of water vapor be removed from the system very quickly and stored in a small volume.

SUMMARY OF THE INVENTION

One aspect of the present invention is directed to a composition of matter that is a desiccant composition. The desiccant composition preferably includes a porous support material and an absorbent dispersed on the porous support material wherein the porous support material has a pore volume of at least about 0.8 cc/g and an average pore size of from about 1 to about 20 nanometers.

The porous support can include a material such as activated carbon or silica. In one embodiment, the desiccant composition includes a porous silica support material and an absorbent salt dispersed on the porous silica support.

Another aspect of the present invention is directed to a method for forming a desiccant composition, comprising the steps of providing a porous support material having a pore volume of at least about 0.8 cc/g, contacting the porous support material with a flowable medium comprising an absorbent for a time sufficient to substantially fill porosity in the porous support material and then drying the porous support material to remove liquid from the flowable medium and form a desiccant composition comprising the absorbent dispersed on the porous support. The desiccant composition preferably has a pore volume of at least about 0.4 cc/g.

According to another aspect of the present invention a method is provided for absorbing water vapor by contacting the water vapor with a desiccant composition comprising an absorbent dispersed on a porous support for a time sufficient to absorb at least about 0.4 gram of water per gram of desiccant.

DETAILED DESCRIPTION OF THE INVENTION

The present invention is directed to desiccant compositions, methods for producing desiccant compositions and applications of desiccant compositions. The desiccant compositions of the present invention are composite desiccants that include an absorbent, such as a salt, which is dispersed onto a porous support material that has a high pore volume and a controlled pore size. The resulting desiccant has a high affinity for water and is useful in a number of applications that require the absorption of high levels of water. It is a particular advantage of the present invention that a relatively large quantity of water vapor can be absorbed in a relatively small volume of the desiccant. As used herein, the terms absorb, absorption or the like refer to the retention of the water by the desiccant, regardless of the actual mechanism by which the water is retained.

The desiccant according to the present invention includes a porous support material. The porous support material preferably has a high pore volume, and therefore a high surface area, to accommodate the absorption of large amounts of liquid by the desiccant. The pore volume, expressed as a volume per unit mass, can be measured by a nitrogen condensation method. Alternatively, the pore volume can be measured gravimetrically by wicking a wetting fluid into the pores and measuring the change in mass. Support materials having a low pore volume are not capable of forming desiccants that can accommodate the absorption of large quantities of water. For example, carbon molecular sieves, as described in U.S. Pat. No. 5,135,548 by Golden et al., have a pore volume of about 0.2 cc/g or less and are not able to retain large quantities of water.

The pore volume of the porous support according to the present invention is preferably at least about 0.8 cc/g, more preferably at least about 1 cc/g and even more preferably at least about 1.5 cc/g, such as at least about 2 cc/g. In one embodiment, the pore volume of the support material is from about 1.5 cc/g to about 2 cc/g. As is discussed above, support materials having a pore volume of less than about 0.8 cc/g will not effectively retain large amounts of water. Porous support materials having pore volumes in excess of about 8 cc/g may be useful for some applications, however the structural integrity of the support is typically too low for most applications.

In order to accommodate high levels of liquid such as water, it is also important to control the average pore size and pore size distribution of the support material. As used herein, the pore size refers to the pore diameter. The average pore size is preferably at least about 1 nanometer, such as in the range of from about 1 to about 20 nanometers. The pore size distribution is such that there are very few pores having a size of less than about 0.5 nanometers. Pore size can be measured, for example, by nitrogen adsorption.

In addition, the porous support material should be substantially non-reactive to the absorbent which is dispersed onto the porous support surface to form the desiccant. That is, the porous support material should not react with the absorbent in a manner to reduce or eliminate the water absorption properties of the absorbent.

The support material can be selected from virtually any material having the above identified properties. Preferably, the support material is hydrophilic. Particularly preferred materials include activated carbon and silica. A suitable activated carbon is available under the tradename "NUCHAR BAX 1500" from Westvaco Corp. A suitable silica material is available under the tradename "AEROSIL TS 100" from DeGussa Corp. The preferred support material will depend upon the application of the desiccant composition. For example, some support materials have a lower heat of adsorption than others. This represents the amount of heat generated when the desiccant absorbs water. This can be important where the heat generated upon adsorption of the water vapor needs to be minimized. For example, when the desiccant composition is utilized in a sorption cooling device, the heat generated by sorption of the water vapor should be minimized.

The porous support material can come in a variety of shapes and sizes selected for a particular application. In one embodiment, the porous support is provided in the form of small activated carbon pellets having a size in the range of from about 0.5 to 2 millimeters. The size of the pellets can be selected to influence the rate at which water is absorbed wherein larger pellets will absorb water at a slower rate due to the increased path length that the water vapor travels. In another embodiment, the porous support is silica having a size of from about 0.25 to 0.5 millimeters.

According to the present invention, an absorbent is dispersed onto the surface of the porous support. The absorbent is preferably an absorbent salt known in the art and can be selected, for example, from calcium chloride ($CaCl_2$), lithium chloride (LiCl), lithium bromide (LiBr), magnesium chloride ($MgCl_2$), calcium nitrate ($Ca(NO_3)_2$) and potassium fluoride (KF). Other absorbents can include phosphorous pentoxide ($P_2O_5$), magnesium perchlorate ($Mg(ClO_4)_2$), barium oxide (BaO), calcium oxide (CaO), calcium sulfate ($CaSO_4$), aluminum oxide ($Al_2O_3$), calcium bromide ($CaBr_2$), barium perchlorate ($Ba(ClO_4)_2$) and copper sulfate ($CuSO_4$). Combinations of two or more of these salts can also be used and the particularly preferred absorbent will depend upon the application of the desiccant.

The desiccant composition according to the present invention can be formed by contacting the porous support material with a liquid solution comprising the absorbent. For example, the porous support can be contacted with a pre-determined amount of liquid solution that is sufficient to fill the porosity of the porous support with the solution without substantial excess. The solution is typically aqueous-based, however non-aqueous solutions such as ethanol solutions can be used for wicking into hydrophobic porous support materials. Preferably, the solution is a saturated solution of the absorbent salt. In a preferred embodiment, the solution includes sufficient absorbent to provide a desiccant composition comprising from about 20 weight percent to about 80 weight percent of the absorbent, more preferably from about 40 weight percent to about 60 weight percent of the absorbent, and even more preferably from about 45 to about 55 weight percent of the absorbent.

Thus, the available pore volume for a given amount of porous support material is calculated and the porous support material is then contacted with a volume of the solution approximately equal to the pore volume. The entire solution wicks into the porosity, leaving virtually no excess solution filling the channels between support particles or on the outer surface.

Alternatively, the porous support can be contacted with a solution of the absorbent for a calculated amount of time so that the porosity is substantially filled without excess solution residing on the support surface.

The porous support is then dried to remove the solvent. For example, the porous support coated with the salt solution can be dried at an elevated temperature (e.g., about 200° C.) for a sufficient period of time to drive off the solvent and crystallize the absorbent salt.

The amount of absorbent dispersed onto the porous support is carefully controlled to ensure maximum water sorption properties. For example, after impregnation of the absorbent, it is preferred that the pore volume of the desiccant is at least about 50 percent of the pore volume of the porous support, and even more preferably at least about 66 percent of the pore volume of the porous support. That is, it is preferred that if the pore volume of the porous support is about 1.5 cc/g, then the pore volume of the desiccant is preferably no less than about 0.75 cc/g, more preferably no less than about 1.0 cc/g. Such high pore volumes can be realized even at high absorbent loadings such as 40 to 60 weight percent.

The desiccant composition according to the present invention is preferably capable of absorbing at least about 100 percent of its weight in water, more preferably at least about 150 percent of its weight in water and even more preferably at least about 200 percent of its weight in water. The amount of water that can be absorbed will also be influenced by the relative humidity and temperature, as is illustrated in the examples below.

The desiccant composition of the present invention is useful in a number of applications. In many applications the desiccant is used in the form of a packed bed. The relative density of the packed bed will partially control the rate of water absorption into the bed.

The desiccant composition of the present invention can also be regenerated for multiple uses by heating the desiccant to remove water.

EXAMPLES

The following examples illustrate various embodiments of the present invention. In each of Examples 1–15, the absorbent was calcium chloride ($CaCl_2$). A solution of calcium chloride ($CaCl_2$) was prepared by adding a water-soluble, anhydrous calcium chloride salt (Alfa Aesar, Ward Hill, Mass.) to deionized water to form a salt solution and contacting the porous support with the solution in a manner such that the solution was wicked into the porous support structure. In Examples 16–19, lithium chloride (LiCl) was the absorbent salt and the samples were prepared in a similar manner.

In all examples using activated carbon as a porous support material, activated carbon pellets (BAX 1500, Westvaco Corp.) were used. The particles had a mean particle diameter, as-received, of about 2.2 mm and consisted of cylindrical pellets measuring from about 2 mm to 4 mm in length. To obtain reduced particle sizes in the following examples, the as-received carbon was ground and sieved. The resulting mean particle size was determined by sieving. The measured BET surface area of the as-received activated carbon was 2178 $m^2/g$, the pore volume was about 1.5 cc/g and the average pore diameter was about 27 Å.

For the following examples that utilized silica as a porous support material, AEROSIL TS 100 (DeGussa Corp.) was utilized. The porous silica had a pore volume of about 8 cc/g.

For Examples 1 to 7 and 17, the available pore volume in the porous support was calculated and the amount of deionized water used was equal to the available pore volume. For Examples 8 to 12 and 16, the volume of water was calculated as the amount needed to dissolve the available calcium chloride. The solubility of calcium chloride at room temperature is about 0.75 g/ml and the solubility of lithium chloride at room temperature is about 0.63 g/ml.

BET theory was used to calculate surface area for the samples. The nitrogen adsorption isotherm for each sample was measured using 5 points distributed between a relative pressure of 0.05 and 0.25. The samples were outgased at 150° C. and 0.01 torr for 3 hours prior to measurement.

Example 1

0.34 grams of anhydrous calcium chloride was added to 11 ml of deionized water at room temperature and the salt was allowed to dissolve. 6.5 grams of activated carbon having a mean particle size of about 150 μm and previously dried at 130° C. for 3 hours was then added to the solution and stirred until all of the solution was adsorbed into the activated carbon. The sample was then placed in a convection oven at 200° C. for 18 hours to dry the calcium chloride. The resulting desiccant composition included 5 weight percent calcium chloride.

Example 2

1.15 grams of calcium chloride was added to 11 ml of deionized water at room temperature and allowed to dissolve. 6.5 grams of activated carbon having a mean particle size of about 150 μm and previously dried at 130° C. for 3 hours was then added to the solution and stirred until all of the solution was adsorbed into the activated carbon. The sample was then placed in a convection oven at 200° C. for 18 hours to dry the calcium chloride. The resulting desiccant composition included 15 weight percent calcium chloride and the BET surface area was 1793 $m^2/g$.

Example 3

2.3 grams of calcium chloride was added to 11 ml of deionized water at room temperature and the salt was allowed to dissolve. 6.5 grams of activated carbon having a mean particle size of about 150 μm and previously dried at 130° C. for 3 hours was then added to the solution and stirred until all of the solution was adsorbed into the activated carbon. The sample was then placed in a convection oven at 200° C. for 18 hours. The resulting desiccant composition included 26 weight percent calcium chloride and the BET surface area was 1047 $m^2/g$.

Example 4

0.67 grams of calcium chloride was added to 10 ml of deionized water at room temperature and the salt was allowed to dissolve. 6 grams of activated carbon having a mean particle size of about 250 μm and previously dried at 130° C. for 3 hours was then added to the solution and stirred until all of the solution was adsorbed into the activated carbon. The sample was then placed in a convection oven at 200° C. for 18 hours. The resulting desiccant composition included 10 weight percent calcium chloride.

Example 5

1.1 grams of calcium chloride was added to 10 ml of deionized water at room temperature and the salt was allowed to dissolve. 6 grams of activated carbon having a mean particle size of about 250 μm and previously dried at 130° C. for 3 hours was then added to the solution and stirred until all of the solution was adsorbed into the activated carbon. The sample was then placed in a convection oven at 200° C. for 18 hours. The resulting desiccant composition included 15.5 weight percent calcium chloride.

Example 6

2.6 grams of calcium chloride was added to 10 ml of deionized water at room temperature and the salt was allowed to dissolve. 6 grams of activated carbon having a mean particle size of about 250 μm and previously dried at 130° C. for 3 hours was then added to the solution and stirred until all of the solution was adsorbed into the activated carbon. The sample was then placed in a convection oven at 200° C. for 18 hours. The resulting desiccant composition included 30 weight percent calcium chloride and the BET surface area was 663 $m^2/g$.

Example 7

227 grams of calcium chloride was added to 386 ml of deionized water at room temperature and the salt was allowed to dissolve. 227 grams of activated carbon having a mean particle size of about 1.3 mm was then added to the solution and stirred until all of the solution was adsorbed into the activated carbon. The sample was then placed in a convection oven at 200° C. for 18 hours to dry the calcium chloride. The resulting desiccant composition included 50 weight percent calcium chloride and the BET surface area was 353 $m^2/g$.

Example 8

227 grams of calcium chloride was added to 303 ml of deionized water at room temperature and the salt was allowed to dissolve. 227 grams of activated carbon having a mean particle size of about 1.3 mm was then added to the solution and stirred until all of the solution was adsorbed into the activated carbon. The sample was then placed in a convection oven at 200° C. for 18 hours to dry the calcium chloride. The resulting desiccant composition included 50 weight percent calcium chloride and the BET surface area was 119 $m^2/g$.

Example 9

227 grams of calcium chloride was added to 303 ml of deionized water at room temperature and the salt was allowed to dissolve. 227 grams of activated carbon having a mean particle size of about 1.3 mm was added to the solution and stirred until all of the solution was adsorbed into the activated carbon. The sample was then placed in a convection oven at 200° C. for 18 hours. The resulting desiccant included 50 weight percent calcium chloride. The BET surface area was 70 m²/g. After the sample was dry it was ground, sieved and separated into 3 sample groups having mean particle sizes of about 1 mm (Example 9a), 250 μm (Example 9b) and 150 μm (Example 9c).

Example 10

100 grams of calcium chloride was added to 134 ml of room temperature deionized water and the salt was allowed to dissolve. 100 grams of activated carbon having a mean particle size of about 1.3 mm was added to the solution and stirred until all of the solution was adsorbed into activated carbon. The sample was then placed in a convection oven at 200° C. for 18 hours. The resulting desiccant composition included a 50 weight percent calcium chloride and the BET surface area was 70 m²/g.

Example 11

50 grams of calcium chloride was added to 67 ml of deionized water at room temperature and the salt was allowed to dissolve. 50 grams of activated carbon having a mean particle size of about 2 to 3 mm and previously dried in 130° C. convection oven for 3 hours was added to the solution and stirred until all of the solution was adsorbed into the activated carbon. The sample was then placed in a convection oven at 200° C. for 18 hours. The resulting desiccant composition included 50 weight percent calcium chloride.

TABLE I

| Example | CaCl₂ (wt. %) | Mean Particle Size of Support | BET Surface Area (m²/g) |
|---|---|---|---|
| 1 | 5 | 150 μm | N/A |
| 2 | 15 | 150 μm | 1793 |
| 3 | 26 | 150 μm | 1122 |
| 4 | 10 | 250 μm | 663 |
| 5 | 15 | 250 μm | 663 |
| 6 | 30 | 250 μm | 663 |
| 7 | 50 | 1.3 mm | 353 |
| 8 | 50 | 1.3 mm | 119 |
| 9[1] | 50 | 1.3 mm | 70 |
| 10 | 50 | 1.3 mm | 70 |
| 11 | 50 | 2–3 mm | N/A |

[1]before sieving

Water adsorption was used to measure the capacity of the samples to adsorb water at 6 different relative humidities. Using salt solutions, 6 different environments of a specific relative humidity were created in containers. The containers were sealed, allowed to reach equilibrium and then approximately 1 g of each sample was placed in the containers. To measure water adsorption at temperatures greater than 25° C., containers were placed in a convection oven at 60° C. and 100° C. Samples were weighed every 24 hours until capacitance was reached and weight percent gained calculated.

The results of these test for Examples 1–11 are illustrated in Table II. The level of absorption generally increased with increased amounts of absorbent dispersed on the porous support. Compare Examples 1, 2 and 3 (increased levels of absorbent at a mean particle size of 150 μm) and compare Examples 4, 5 and 6 (increased levels of absorbent at a mean particle size of 250 μm).

TABLE II

| | Weight % gained (grams water per grams desiccant) Relative Humidity | | | | |
|---|---|---|---|---|---|
| | 6% | 16% | 29% | 53% | 84% |
| Example 1 | 6 | 6 | 12 | 24 | 79 |
| Example 2 | 17 | 17 | 29 | 42 | 96 |
| Example 3 | 34 | 33 | 48 | 30 | 88 |
| Example 4 | 13 | 11 | 19 | 28 | 69 |
| Example 5 | 17 | 17 | 26 | 36 | 69 |
| Example 6 | 31 | 32 | 44 | 51 | 76 |
| Example 9a | 32 | 30 | 46 | 59 | 102 |
| Example 9b | 44 | 43 | 61 | 76 | 126 |
| Example 9c | 42 | 41 | 59 | 73 | 116 |
| Example 10 | 61 | 37 | 76 | 93 | 144 |
| Example 11 | 51 | 44 | 78 | 98 | 170 |

For Example 9a, the effect of temperature on adsorption was measured. Table III illustrates the absorption at 60° C. and Table IV illustrates the absorption at 100° C.

TABLE III

| | Weight % gained (grams water per grams desiccant) Relative Humidity | | | | | |
|---|---|---|---|---|---|---|
| Example | 6% | 10% | 16% | 50% | 75% | 80% |
| Example 9a | 28 | 22 | 38 | 53 | 113 | 99 |

TABLE IV

| | Weight % gained (grams water per grams desiccant) Relative Humidity | | | | |
|---|---|---|---|---|---|
| Example | 7% | 9% | 46% | 74% | 76% |
| Example 9a | 22 | 48 | 61 | 110 | 102 |

Example 13

This example utilizes 2 separate wicking steps to increase the amount of calcium chloride dispersed on the activated carbon support. In Step 1, 12.665 grams of calcium chloride was added to 17 ml of deionized water at room temperature and the salt was allowed to dissolve. 10 grams of activated carbon having a mean particle size of about 1.3 mm and previously dried at 130° C. in a convection oven for 3 hours was added to this first solution and stirred until all of the solution was adsorbed into the activated carbon. The sample was then placed in a convection oven of 200° C. for 18 hours.

In Step 2, a second solution was prepared. 2.335 grams of calcium chloride was added to 3.13 ml of deionized water at room temperature and the salt was allowed to dissolve. The sample from Step 1 was added to the second wicking solution and was stirred until all of the solution was adsorbed into the activated carbon. The sample was then placed in a convection oven at 200° C. for 18 hours. The resulting desiccant composition included 60 weight percent calcium chloride.

Example 14

10 grams of calcium chloride was added to 100 ml of deionized water at room temperature and the salt was allowed to dissolve. 10 grams of hydrophilic silica aerogel was added to the solution and stirred until all of the solution was adsorbed into the hydrophilic silica aerogel. The sample was then placed in a convection oven at 200° C. for 18 hours to dry the calcium chloride. The resulting desiccant composition included 50 weight percent calcium chloride.

Example 15

10 grams of calcium chloride was added to 10 ml of deionized water at room temperature and the salt was allowed to dissolve. The solution was then stirred into 100 ml of ethanol. 10 grams of hydrophobic silica aerogel, was added to the solution and stirred until all of the solution was adsorbed into the hydrophobic silica aerogel. The sample was then placed in a convection oven at 200° C. for 18 hours to dry the calcium chloride. The resulting desiccant composition included 50 weight percent calcium chloride.

Example 16

6 grams of lithium chloride was added to 10 ml of deionized water at room temperature and the salt was allowed to dissolve. 10 grams of activated carbon pellets 2 to 4 mm in length and previously dried at 130° C. for 3 hours was added to the solution and stirred until all of the solution was adsorbed into the activated carbon. The sample was then placed in a convection oven of 200° C. for 18 hours. The resulting desiccant composition included about 38 weight percent lithium chloride.

Example 17

10 grams of lithium chloride was added to 17 ml of deionized water at room temperature and the salt was allowed to dissolve. 10 grams of activated carbon pellets 2 to 4 mm in length and previously dried at 130° C. for 3 hours was added to the solution and stirred until all of the solution was adsorbed into the activated carbon. The sample was then placed in a convection oven at 200° C. for 18 hours. The resulting desiccant composition included 50 weight percent lithium chloride.

Example 18

10 grams of lithium chloride was added to 17 ml of deionized water at room temperature and the salt was allowed to dissolve. 10 grams of activated carbon pellets 2 to 4 mm in length and previously dried at 130° C. for 3 hours was added to the solution and stirred until all of the solution was adsorbed into the activated carbon. The sample was then placed in a convection oven at 200° C. for 18 hours.

A second solution was prepared by adding 5 grams of lithium chloride to 8 ml of deionized water at room temperature and allowing the salt to dissolve. Preparation of the sample was completed by mixing the sample from step 1 above with the second solution and stirring until all of the solution was adsorbed into the activated carbon. The sample was then placed in a convection oven of 200° C. for 18 hours. The resulting desiccant composition included 60 weight percent lithium chloride.

Example 19

10 grams of lithium chloride was added to 17 ml of deionized water at room temperature and the salt was allowed to dissolve. 10 grams of activated carbon previously dried at 130° C. for 3 hours was added to the solution and stirred until all of the solution was adsorbed into the activated carbon. The sample was then dried at 200° C. for 18 hours.

A second solution was prepared by adding 7.6 grams of lithium chloride to 12 ml of deionized water at room temperature and the salt was allowed to dissolve. Preparation of the sample was completed by mixing the sample from step 1 into the second solution and stirring until all of the solution was adsorbed into the activated carbon. The sample was then dried at 200° C. for 18 hours.

A third solution was prepared by adding 2.4 grams of lithium chloride to 3.8 ml of deionized water at room temperature and the salt was allowed to dissolve. Preparation of the sample was completed by mixing the step 1 sample, while stirring, into the second wicking solution and stirred until all of the solution was adsorbed into the activated carbon pores. The sample was then dried at 200° C. for 18 hours. The resulting desiccant composition included about 67 weight percent lithium chloride.

For Examples 16–19 utilizing lithium chloride as an absorbent, the samples were tested for water absorption at different humidity levels. Using salt solutions, 6 different environments of a specific relative humidity were created in containers. The containers were sealed, allowed to reach equilibrium and then approximately 1 g of each sample was placed in the containers. The result are illustrated in Table V. The desiccant compositions were able to absorb up to almost 3 times their weight in water in a high humidity environment.

TABLE V

| Example | Weight % LiCl | Weight % gained (grams water per grams desiccant) Relative Humidity | | | | |
|---|---|---|---|---|---|---|
| | | 6% | 16% | 29% | 53% | 84% |
| 16 | 38 wt % |    | 25  | 40  | 61  | 122 |
| 17 | 50 wt % | 36 | 64  | 81  | 116 | 194 |
| 18 | 60 wt % | 35 | 78  | 101 | 138 | 225 |
| 19 | 67 wt % | 47 | 100 | 115 | 168 | 294 |

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A composite desiccant, comprising a porous support material and an absorbent selected from the group consisting of calcium chloride, lithium chloride, lithium bromide, magnesium chloride, calcium nitrate, potassium fluoride and combinations thereof impregnated onto said porous support material wherein said porous support material has a pore volume of at least about 0.8 cc/g and an average pore size of from about 1 to about 20 nanometers and wherein said composite desiccant has a pore volume that is at least about 50 percent of said pore volume of said porous support.

2. A composite desiccant as recited in claim 1, wherein said porous support material has a pore volume of at least about 1 cc/g.

3. A composite desiccant as recited in claim 1, wherein said porous support material has a pore volume of from about 1.5 cc/g to about 2.0 cc/g.

4. A composite desiccant as recited in claim 1, wherein said porous support comprises activated carbon.

5. A composite desiccant as recited in claim 1, wherein said porous support comprises silica.

6. A composite desiccant as recited in claim 1, wherein said absorbent comprises calcium chloride.

7. A composite desiccant as recited in claim 1, wherein said composite desiccant has a pore volume that is at least about 66 percent of said pore volume of said porous support.

8. A composite desiccant as recited in claim 1, wherein said composite desiccant comprises from about 20 to about 80 weight percent of said absorbent.

9. A composite desiccant as recited in claim 1, wherein said composite desiccant comprises from about 40 to about 60 weight percent of said absorbent.

10. A composite desiccant as recited in claim 1, wherein said composite desiccant is capable of absorbing at least about 1 gram of water for every gram of said composite desiccant.

11. A composite desiccant as recited in claim 1, wherein said absorbent comprises lithium chloride.

12. A composite desiccant, comprising a porous silica support material and an absorbent salt selected from the group consisting of calcium chloride, lithium chloride, lithium bromide, magnesium chloride, calcium nitrate, potassium fluoride and combinations thereof impregnated onto said porous silica support and wherein said composite desiccant comprises from about 20 to about 80 weight percent of said absorbent salt.

13. A composite desiccant as recited in claim 12, wherein said composite desiccant comprises from about 40 to about 60 weight percent of said absorbent salt.

14. A composite desiccant as recited in claim 12, wherein said absorbent salt comprises calcium chloride.

15. A composite desiccant as recited in claim 12, wherein said composite desiccant has a pore volume of at least about 1.0 cc/g.

16. A composite desiccant as recited in claim 12, wherein said composite desiccant is capable of absorbing at least about 1 gram of water per gram of said composite desiccant.

17. A composite desiccant as recited in claim 12, wherein said absorbent salt comprises lithium chloride.

18. A composite desiccant as recited in claim 12, wherein said porous silica support has a pore volume of at least about 0.8 cc/g.

19. A composite desiccant as recited in claim 12, wherein said porous silica support has an average pore size of from about 1 to about 20 nanometers.

20. A composite desiccant as recited in claim 12, wherein said composite desiccant has a pore volume of at least about 50 percent of the pore volume of said porous support.

21. A composite desiccant comprising activated carbon, said activated carbon having an average pore size of from about 1 to about 20 nanometers and a pore volume of at least about 0.8 cc/g and an absorbent salt impregnated on said activated carbon and wherein said composite desiccant comprises from about 20 to about 80 weight percent of said absorbent salt.

22. A composite desiccant as recited in claim 21, wherein said absorbent salt is selected from the group consisting of calcium chloride, lithium chloride, lithium bromide, magnesium chloride, calcium nitrate, potassium fluoride and combinations thereof.

23. A composite desiccant as recited in claim 21, wherein said composite desiccant comprises from about 40 to about 60 weight percent of said absorbent salt.

24. A composite desiccant composition as recited in claim 21, wherein said activated carbon is in the form of activated carbon pellets.

25. A composite desiccant, comprising a porous support material and an absorbent selected from the group consisting of calcium chloride, lithium chloride, lithium bromide, magnesium chloride, calcium nitrate, potassium fluoride and combinations thereof impregnated onto said porous support material wherein said porous support material has a pore volume of at least about 0.8 cc/g and an average pore size of from about 1 to about 20 nanometers and wherein said composite desiccant comprises from about 20 to about 80 weight percent of said absorbent.

26. A composite desiccant as recited in claim 25, wherein said porous support material has a pore volume of at least about 1 cc/g.

27. A composite desiccant as recited in claim 25, wherein said porous support material has a pore volume of from about 1.5 cc/g to about 2.0 cc/g.

28. A composite desiccant as recited in claim 25, wherein said porous support comprises activated carbon.

29. A composite desiccant as recited in claim 25, wherein said porous support comprises silica.

30. A composite desiccant as recited in claim 25, wherein said absorbent comprises calcium chloride.

31. A composite desiccant as recited in claim 25, wherein said composite desiccant has a pore volume that is at least about 66% of said pore volume of said porous support.

32. A composite desiccant as recited in claim 25, wherein said composite desiccant comprises from about 40 to about 60 weight percent of said absorbent.

33. A composite desiccant as recited in claim 25, wherein said composite desiccant is capable of absorbing at least about 1 gram of water for every gram of said composite desiccant.

34. A composite desiccant as recited in claim 25, wherein said absorbent comprises lithium chloride.

35. A composite desiccant, comprising a porous silica support material and an absorbent salt selected from the group consisting of calcium chloride, lithium chloride, lithium bromide, magnesium chloride, calcium nitrate, potassium fluoride and combinations thereof impregnated onto said porous silica support and wherein said composite desiccant has a pore volume of at least about 50 percent of the pore volume of said porous support.

36. A composite desiccant as recited in claim 35, wherein said composite desiccant comprises from about 40 to about 60 weight percent of said absorbent salt.

37. A composite desiccant as recited in claim 35, wherein said absorbent comprises calcium chloride.

38. A composite desiccant as recited in claim 35, wherein said composite desiccant has a pore volume of at least about 1.0 cc/g.

39. A composite desiccant as recited in claim 35, wherein said composite desiccant is capable of absorbing at least about 1 gram of water per gram of said composite desiccant.

40. A composite desiccant as recited in claim 35, wherein said absorbent comprises lithium chloride.

41. A composite desiccant as recited in claim 35, wherein said silica support has a pore volume of at least about 0.8 cc/g.

42. A composite desiccant as recited in claim 35, wherein said silica support has an average pore size of from about 1 to about 20 nanometers.

* * * * *

UNITED STATES PATENT AND TRADEMARK OFFICE
CERTIFICATE OF CORRECTION

PATENT NO.     : 6,559,096 B1
DATED          : May 6, 2003
INVENTOR(S)    : Smith et al.

It is certified that error appears in the above-identified patent and that said Letters Patent is hereby corrected as shown below:

<u>Column 12,</u>
Lines 57 and 60, after the word "said", insert -- porous --.

Signed and Sealed this

Twenty-sixth Day of August, 2003

JAMES E. ROGAN
*Director of the United States Patent and Trademark Office*